(12) United States Patent
Vantilburg

(10) Patent No.: US 8,669,878 B1
(45) Date of Patent: Mar. 11, 2014

(54) CARBON MONOXIDE ACTIVATED GARAGE DOOR OPENING SYSTEM AND ASSOCIATED METHOD

(76) Inventor: Thomas L. Vantilburg, Huntley, IL (US)

( * ) Notice: Subject to any disclaimer, the term of this patent is extended or adjusted under 35 U.S.C. 154(b) by 897 days.

(21) Appl. No.: 12/720,478

(22) Filed: Mar. 9, 2010

Related U.S. Application Data

(60) Provisional application No. 61/209,488, filed on Mar. 9, 2009.

(51) Int. Cl.
*G08B 1/00* (2006.01)

(52) U.S. Cl.
USPC ............................ 340/632; 340/506; 318/282

(58) Field of Classification Search
USPC ..................... 340/632, 506; 422/98; 318/282; 307/116
See application file for complete search history.

(56) References Cited

U.S. PATENT DOCUMENTS

| | | | | |
|---|---|---|---|---|
| 4,338,526 | A | * | 7/1982 | Martin et al. ................. 307/116 |
| 4,819,551 | A | | 4/1989 | Vole |
| 4,884,222 | A | * | 11/1989 | Nagashima et al. .......... 340/506 |
| 5,576,739 | A | | 11/1996 | Murphy |
| 5,896,089 | A | * | 4/1999 | Bowles .......................... 340/632 |
| 5,955,031 | A | * | 9/1999 | King, Jr. ......................... 422/98 |
| D431,487 | S | | 10/2000 | Rienks |
| 2001/0013762 | A1 | * | 8/2001 | Roman .......................... 318/282 |
| 2010/0201531 | A1 | * | 8/2010 | Pakravan et al. .............. 340/632 |

* cited by examiner

*Primary Examiner* — Steven Lim
*Assistant Examiner* — Kaleria Knox

(57) ABSTRACT

A carbon monoxide activated garage door opening system including a garage door opening system connected to an existing garage door and a user interface communicatively coupled to the garage door opening system for toggling the garage door between open and closed positions based upon receiving a corresponding user input at the user interface. Such a user interface preferably has a first carbon monoxide detector located therein for detecting an initial carbon monoxide level in the ambient air surrounding the user interface. A second carbon monoxide detector is attached to a rear side of the user interface for confirming whether the initial carbon monoxide level is an unsafe carbon monoxide level. In this manner, upon validating the unsafe carbon monoxide level, the user interface is adapted to automatically override the user input and thereby open the garage door.

15 Claims, 4 Drawing Sheets

FIG. 1A

CARBON MONOXIDE ACTIVATED GARAGE DOOR OPENING SYSTEM AND ASSOCIATED METHOD

CROSS REFERENCE TO RELATED APPLICATIONS

This application claims the benefit of U.S. Provisional Application No. 61/209,488, filed Mar. 9, 2009, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to garage door opening systems and, more particularly, to a carbon monoxide activated garage door opening system for providing homeowners with a convenient means of ensuring that dangerous levels of carbon monoxide will not build up in their homes.

2. Prior Art

The possibility of carbon monoxide poisoning is a serious safety hazard. Carbon monoxide accounts for one half the fatal poisoning in the United States each year, from a minimum of about 200 to as many as 1500. Carbon monoxide is a serious hazard because of its strong attraction to hemoglobin which normally combines with oxygen in the lungs and carries it throughout the body. When carbon monoxide is present, it replaces the oxygen and, in high enough concentration, poisoning can result.

Carbon monoxide is a by-product of incomplete combustion. Since it is odorless and colorless, there is no warning of its presence. Carbon monoxide sources include automobile exhaust fumes, furnaces, kitchen gas ranges, water heaters, fireplaces, charcoal grills, and small gasoline engine operated equipment. Moreover, with the current concern for energy efficiency, many recently built homes do not provide adequate fresh air flow. Homes are tighter because of more insulation, caulking, insulating window films and weather stripping. If there is inadequate fresh air flow, the opportunity arises for carbon monoxide build-up. Carbon monoxide poisoning is more of a problem during the winter because heating systems are running.

Accordingly, a need remains for a carbon monoxide activated garage door opening system in order to overcome the above-noted shortcomings. The present invention satisfies such a need by providing a system that is convenient and easy to use, is durable yet lightweight in design, is versatile in its applications, and provides a means for rapidly dispelling carbon monoxide.

BRIEF SUMMARY OF THE INVENTION

In view of the foregoing background, it is therefore an object of the present invention to provide a carbon monoxide activated garage door opening system for preventing exposure to lethal levels of carbon monoxide inside a garage. These and other objects, features, and advantages of the invention are provided by a carbon monoxide activated garage door opening system including a garage door opening system adapted to be connected to an existing garage door and a portable and manually operable user interface communicatively coupled to the garage door opening system for toggling the garage door between open and closed positions based upon receiving a corresponding user input at the user interface. Such a user interface preferably has a first carbon monoxide detector located therein for detecting an initial carbon monoxide level in the ambient air surrounding the user interface.

A second carbon monoxide detector is attached to a rear side of the user interface for confirming whether the initial carbon monoxide level is an unsafe carbon monoxide level. In this manner, upon validating the unsafe carbon monoxide level, the user interface is adapted to automatically override the user input and thereby open the garage door.

In one embodiment, the second carbon monoxide detector is communicatively coupled to the user interface in such a manner that the second carbon monoxide detector overrides the user input upon verifying the unsafe carbon monoxide level.

In one embodiment, the user interface preferably includes a portable housing having a plurality of vents formed along an outer surface thereof. Such a housing contains the first carbon monoxide detector therein and has a plurality of control buttons formed on the outer surface of the housing for receiving the user input. An interior plate is directly affixed to a rear side of the housing, and a back plate directly affixed to the housing such that the interior plate is intercalated between the back plate and the rear side of the housing while remaining positioned exterior of the housing. In this manner, the second carbon monoxide detector is connected to the interior plate and faces the rear side of the housing.

In one embodiment, the second housing may further include an internal power supply source and a switch connected thereto. Such a first carbon monoxide detectors is communicatively mated to the internal power supply source and the switch respectively. The second carbon monoxide detector is connected to the switch. A logic gate is connected to the first and second carbon monoxide detectors. In this structural arrangement, upon detecting the first carbon monoxide level, the first carbon monoxide detector generates and transmits first and second true signals to the logic gate and the switch respectively and thereby causing the switch to close.

Advantageously, power is transmitted to the second carbon monoxide detector upon closure of the switch such that the second carbon monoxide detector measures a second carbon monoxide level in the ambient air. The first carbon monoxide level is unsafe if the second carbon monoxide level is at least as high as the first carbon monoxide level.

Notably, upon validating the unsafe carbon monoxide level, the second carbon monoxide detector generates and transmits third and fourth true signals to the logic gate and the switch respectively and thereby maintains the switch at a closed position. Upon receiving the first and third true signals, the logic gate generates and transmits an true output override signal to the user interface thereby instructing the user interface to adapt the garage door to an open position.

Upon invalidating the unsafe carbon monoxide level, the second carbon monoxide detector generates and transmits first and second false signals to the logic gate respectively and thereby toggles the switch to an open position. In this manner, upon receiving the third false signal, the logic gate generates and transmits a false output override signal to the user interface thereby instructing the user interface to take no action.

The present invention may further include a method of utilizing a carbon monoxide activated garage door opening system for preventing exposure to lethal levels of carbon monoxide inside a garage. Such a method preferably includes the steps of: providing and connecting a garage door opening system to an existing garage door; providing and communicatively coupling a portable and manually operable user interface to the garage door opening system for toggling the garage door between open and closed positions based upon receiving a corresponding user input at the user interface; providing and locating a first carbon monoxide detector in the user interface for detecting an initial carbon monoxide level in the ambient air surrounding the user interface; providing and attaching a second carbon monoxide detector to a rear side of the user interface for confirming whether the initial carbon monoxide level is an unsafe carbon monoxide level; and upon validating the unsafe carbon monoxide level, the user interface automatically overriding the user input and thereby opening the garage door.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 1:
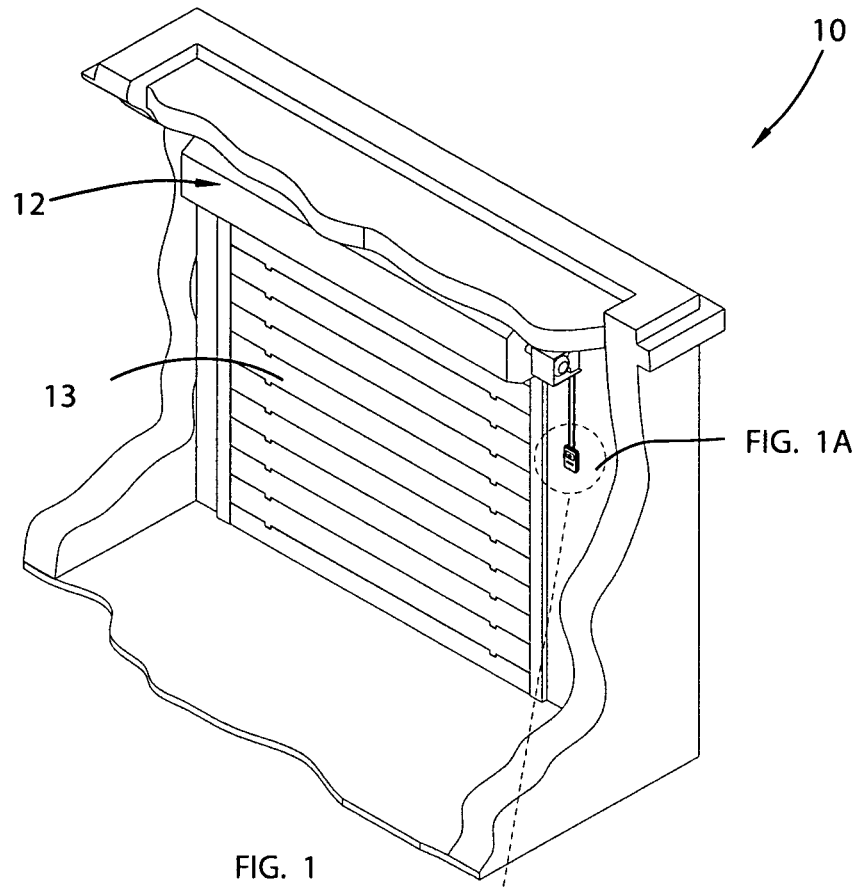
FIG. 1 is a perspective view showing a carbon monoxide activated garage door opening system, in accordance with the present invention.
Figure 1A:
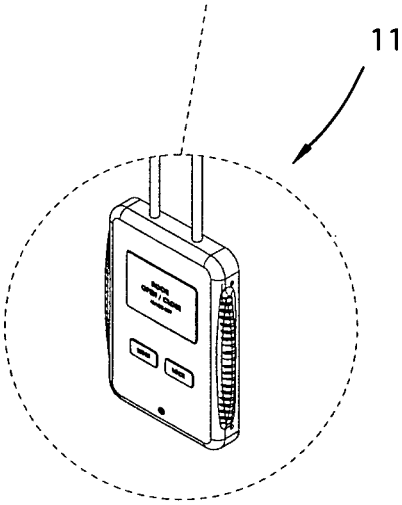
FIG. 1A is an enlarged view of the user interface shown in FIG. 1.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "present invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The below disclosed subject matter is to be considered illustrative, and not restrictive, and the appended claims are intended to cover all such modifications, enhancements, and other embodiments which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

Figure 2:
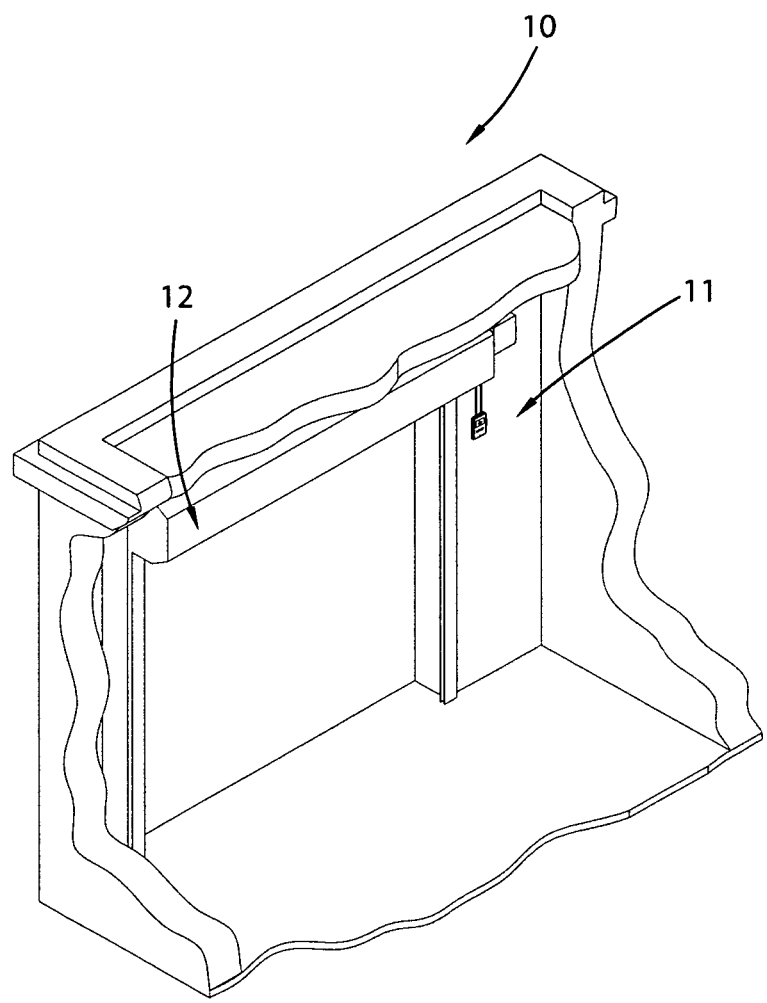
FIG. 2 is a perspective view showing the garage door at an open position.
Figure 3:
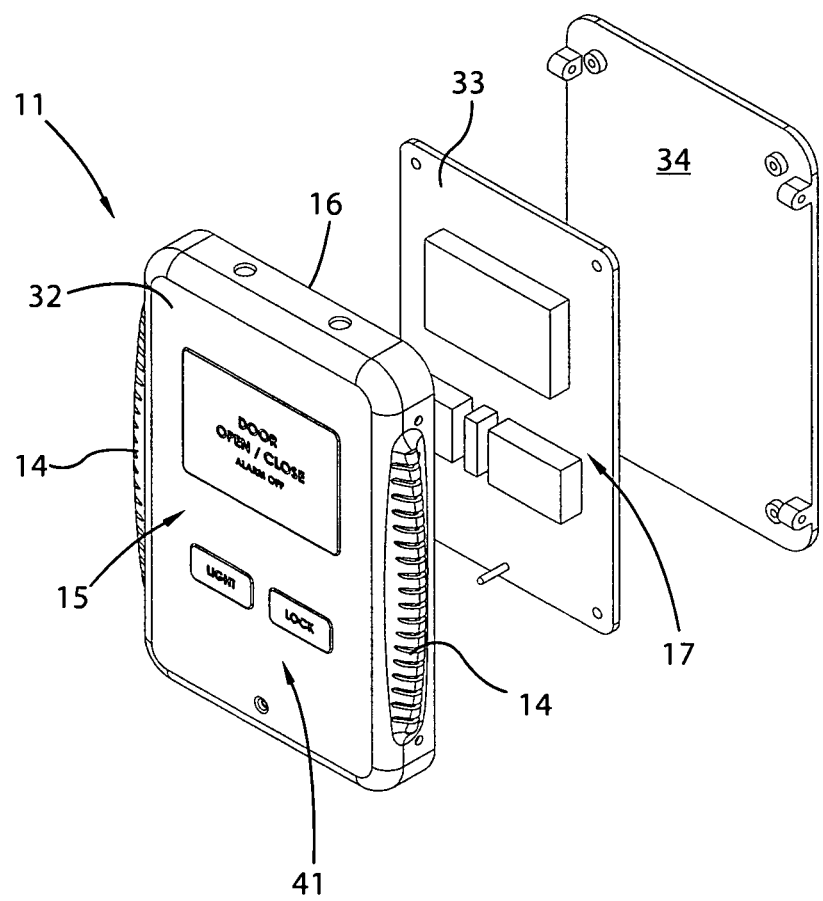
FIG. 3 is an exploded view showing the structural arrangement of the housing, interior plate and back plate with respect to the second carbon monoxide detector.
Figure 4:
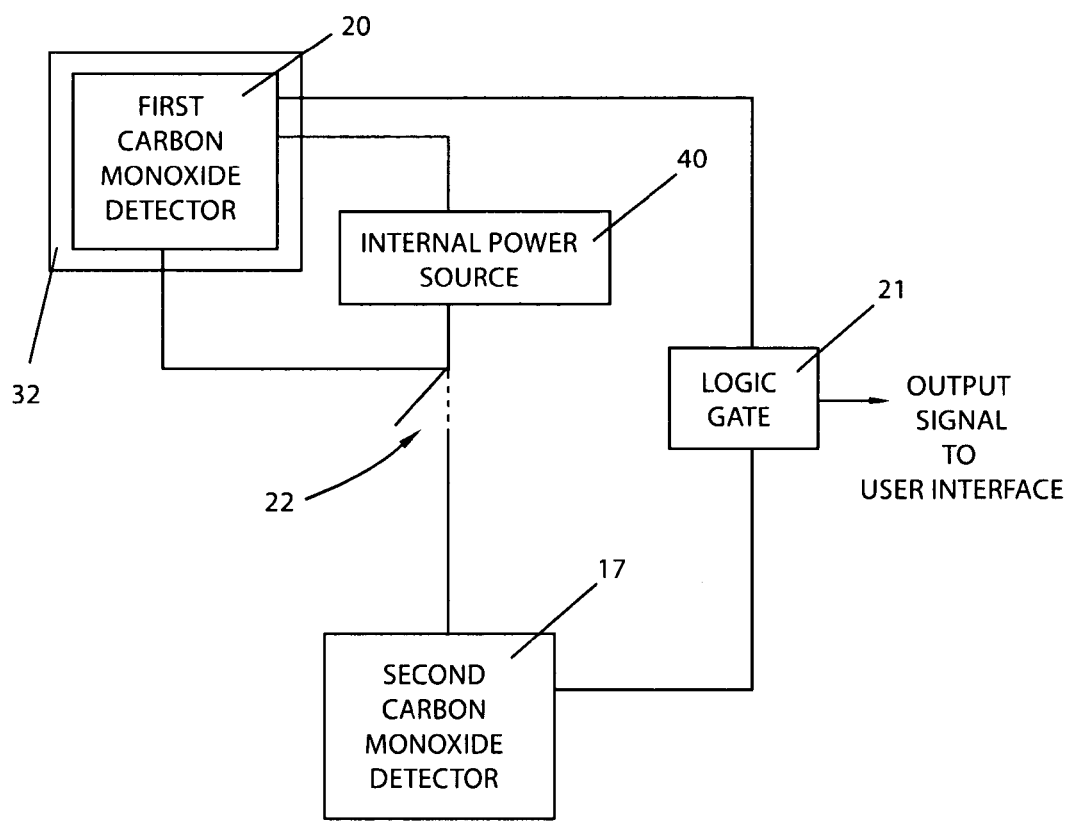
FIG. 4 is a high-level schematic block diagram showing the interrelationship between the major electronic components of the present invention.

The system of this invention is referred to generally in FIGS. 1-4 and is intended to a carbon monoxide activated garage door opening system 10 for preventing exposure to lethal levels of carbon monoxide inside a garage. Such a carbon monoxide activated garage door opening system 10 includes a garage door opening system 12 adapted to be connected to an existing garage door 13 and a portable and manually operable user interface 11 communicatively coupled to the garage door opening system 12 for toggling the garage door 13 between open and closed positions based upon receiving a corresponding user input at the user interface 11. Such a user interface 11 preferably has a first carbon monoxide detector 20 located therein for detecting an initial carbon monoxide level in the ambient air surrounding the user interface 11.

A second carbon monoxide detector 17 is attached to a rear side 16 of the user interface 11 for confirming whether the initial carbon monoxide level is an unsafe carbon monoxide level. In this manner, upon validating the unsafe carbon monoxide level, the user interface 11 is adapted to automatically override the user input and thereby open the garage door 13. By employing first and second carbon monoxide detectors 20, 17 in a manner wherein the second carbon monoxide detector 17 is activated only when the first carbon monoxide detector 20 initially detects an alleged unsafe carbon monoxide level. Thus, a validating system is provided without utilizing unnecessary power from the internal power supply source.

In one embodiment, the second carbon monoxide detector 17 is communicatively coupled to the user interface 11 in such a manner that the second carbon monoxide detector 17 overrides the user input upon verifying the unsafe carbon monoxide level.

In one embodiment, the user interface 11 preferably includes a portable housing 32 having a plurality of vents 14 formed along an outer surface thereof. Such a housing 32 contains the first carbon monoxide detector 20 therein and has a plurality of control buttons 15 formed on the outer surface of the housing 32 for receiving the user input. An interior plate 33 is directly affixed to a rear side 16 of the housing 32, and a back plate 34 directly affixed to the housing 32 such that the interior plate 33 is intercalated between the back plate 34 and the rear side 16 of the housing 32 while remaining positioned exterior of the housing 32. In this manner, the second carbon monoxide detector 17 is connected to the interior plate 33 and faces the rear side 16 of the housing 32. Such a structural configuration provides the unpredicted and unexpected result of allowing a user to easily access the second carbon monoxide detector 17 without having to open the housing 32 during routine maintenance.

In one embodiment, the second housing 32 may further include an internal power supply source 40 and a switch 22 connected thereto. The first carbon monoxide detector 20 is communicatively mated to the internal power supply source 40 and the switch 22 respectively. The second carbon monoxide detector 17 is connected to the switch 22. A logic gate 21 is connected to the first and second carbon monoxide detectors 20, 17. In this structural arrangement, upon detecting the first carbon monoxide level, the first carbon monoxide detector 20 generates and transmits first and second true signals to the logic gate 21 and the switch 22 respectively and thereby causes the switch 22 to close.

Advantageously, power is transmitted to the second carbon monoxide detector 17 upon closure of the switch 22 such that the second carbon monoxide detector 17 measures a second carbon monoxide level in the ambient air. The first carbon monoxide level is unsafe if the second carbon monoxide level is at least as high as the first carbon monoxide level and if the first carbon monoxide level is above a predetermined carbon monoxide threshold level.

Notably, upon validating the unsafe carbon monoxide level, the second carbon monoxide detector 17 generates and transmits third and fourth true signals to the logic gate 21 and the switch 22 respectively and thereby maintains the switch 22 at a closed position. Upon receiving the first and third true signals, the logic gate 21 generates and transmits a true output override signal to the user interface 11 thereby instructing the user interface 11 to adapt the garage door 13 to an open position.

Upon invalidating the unsafe carbon monoxide level, the second carbon monoxide detector 17 generates and transmits first and second false signals to the logic gate 21 respectively and thereby toggles the switch 22 to an open position. In this manner, upon receiving the third false signal, the logic gate 21 generates and transmits a false output override signal to the user interface 11 thereby instructing the user interface 11 to take no action.

The present invention may further include a method of utilizing a carbon monoxide activated garage door opening system 10 for preventing exposure to lethal levels of carbon monoxide inside a garage. Such a method preferably includes the steps of: providing and connecting a garage door opening system 12 to an existing garage door 13; providing and communicatively coupling a portable and manually operable user interface 11 to the garage door opening system 12 for toggling the garage door 13 between open and closed positions based upon receiving a corresponding user input at the user interface 11; providing and locating a first carbon monoxide detector 20 in the user interface 11 for detecting an initial carbon monoxide level in the ambient air surrounding the user interface 11; providing and attaching a second carbon monoxide detector 17 to a rear side 16 of the user interface 11 for confirming whether the initial carbon monoxide level is an unsafe carbon monoxide level; and upon validating the unsafe carbon monoxide level, the user interface 11 automatically overriding the user input and thereby opening the garage door 13.

Again referring to the figures in general, LEDs are included that illuminate bright red and an auditory alarm beeps, which is important for notifying occupants that there is an unsafe level of carbon monoxide present. In a wirelessly operated embodiment, a radio frequency transmitter (not shown) is included that generates and transmits a signal that is recognized by a receiving unit (not shown) on the garage door opening system 12. Such a transmitter emits a signal that activates the garage door opening system 12, causing the door 13 to open.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation.

What is claimed as new and what is desired to secure by Letters Patent of the United States is:

1. A carbon monoxide activated garage door opening system for preventing exposure to lethal levels of carbon monoxide inside a garage, said carbon monoxide activated garage door opening system comprising:

a garage door opening system adapted to be connected to an existing garage door;

a user interface communicatively coupled to said garage door opening system for toggling said garage door between open and closed positions based upon receiving a corresponding user input at said user interface, said user interface having a first carbon monoxide detector located therein for detecting an initial carbon monoxide level in the ambient air surrounding said user interface; and a second carbon monoxide detector attached to a rear side of said user interface for confirming whether said initial carbon monoxide level is an unsafe carbon monoxide level;

wherein, upon validating said unsafe carbon monoxide level, said user interface is adapted to automatically override said user input and thereby open the garage door.

2. The carbon monoxide activated garage door opening system of claim 1, wherein said second carbon monoxide detector is communicatively coupled to said user interface in such a manner that said second carbon monoxide detector overrides said user input upon verifying said unsafe carbon monoxide level.

3. The carbon monoxide activated garage door opening system of claim 2, wherein said user interface comprises:
   a portable housing having a plurality of vents formed along an outer surface thereof, said housing containing said first carbon monoxide detector therein;
   a plurality of control buttons formed on said outer surface of said housing for receiving said user input;
   an interior plate directly affixed to a rear side of said housing; and
   a back plate directly affixed to said housing such that said interior plate is intercalated between said back plate and said rear side of said housing while remaining positioned exterior of said housing;
   wherein said second carbon monoxide detector is connected to said interior plate and faces said rear side of said housing.

4. The carbon monoxide activated garage door opening system of claim 3, wherein said second housing further comprises:
   an internal power supply source and a switch connected thereto, said first carbon monoxide detectors being communicatively mated to said internal power supply source and said switch respectively, said second carbon monoxide detector being connected to said switch; and
   a logic gate connected to said first and second carbon monoxide detectors;
   wherein, upon detecting said first carbon monoxide level, said first carbon monoxide detector generates and transmits first and second true signals to said logic gate and said switch respectively and thereby causing said switch to close.

5. The carbon monoxide activated garage door opening system of claim 4, wherein power is transmitted to said second carbon monoxide detector upon closure of said switch such that said second carbon monoxide detector measure a second carbon monoxide level in the ambient air;
   wherein said first carbon monoxide level is unsafe if said second carbon monoxide level is at least as high as said first carbon monoxide level and if the first carbon monoxide level is above a predetermined carbon monoxide threshold level.

6. The carbon monoxide activated garage door opening system of claim 5, wherein, upon validating said unsafe carbon monoxide level, said second carbon monoxide detector generates and transmits third and fourth true signals to said logic gate and said switch respectively and thereby maintains said switch at a closed position;
   wherein, upon receiving said first and third true signals, said logic gate generates and transmits an true output override signal to said user interface thereby instructing said user interface to adapt the garage door to an open position.

7. The carbon monoxide activated garage door opening system of claim 6, wherein, upon invalidating said unsafe carbon monoxide level, said second carbon monoxide detector generates and transmits first and second false signals to said logic gate respectively and thereby toggles said switch to an open position;
   wherein, upon receiving said third false signal, said logic gate generates and transmits a false output override signal to said user interface thereby instructing said user interface to take no action.

8. A carbon monoxide activated garage door opening system for preventing exposure to lethal levels of carbon monoxide inside a garage, said carbon monoxide activated garage door opening system comprising:
   a garage door opening system adapted to be connected to an existing garage door;
   a portable and manually operable user interface communicatively coupled to said garage door opening system for toggling said garage door between open and closed positions based upon receiving a corresponding user input at said user interface, said user interface having a first carbon monoxide detector located therein for detecting an initial carbon monoxide level in the ambient air surrounding said user interface; and
   a second carbon monoxide detector attached to a rear side of said user interface for confirming whether said initial carbon monoxide level is an unsafe carbon monoxide level;
   wherein, upon validating said unsafe carbon monoxide level, said user interface is adapted to automatically override said user input and thereby open the garage door.

9. The carbon monoxide activated garage door opening system of claim 8, wherein said second carbon monoxide detector is communicatively coupled to said user interface in such a manner that said second carbon monoxide detector overrides said user input upon verifying said unsafe carbon monoxide level.

10. The carbon monoxide activated garage door opening system of claim 9, wherein said user interface comprises:
    a portable housing having a plurality of vents formed along an outer surface thereof, said housing containing said first carbon monoxide detector therein;
    a plurality of control buttons formed on said outer surface of said housing for receiving said user input;
    an interior plate directly affixed to a rear side of said housing; and
    a back plate directly affixed to said housing such that said interior plate is intercalated between said back plate and said rear side of said housing while remaining positioned exterior of said housing;
    wherein said second carbon monoxide detector is connected to said interior plate and faces said rear side of said housing.

11. The carbon monoxide activated garage door opening system of claim 10, wherein said second housing further comprises:
    an internal power supply source and a switch connected thereto, said first carbon monoxide detectors being communicatively mated to said internal power supply source and said switch respectively, said second carbon monoxide detector being connected to said switch; and
    a logic gate connected to said first and second carbon monoxide detectors;

wherein, upon detecting said first carbon monoxide level, said first carbon monoxide detector generates and transmits first and second true signals to said logic gate and said switch respectively and thereby causing said switch to close.

12. The carbon monoxide activated garage door opening system of claim 11, wherein power is transmitted to said second carbon monoxide detector upon closure of said switch such that said second carbon monoxide detector measure a second carbon monoxide level in the ambient air;
   wherein said first carbon monoxide level is unsafe if said second carbon monoxide level is at least as high as said first carbon monoxide level and if the first carbon monoxide level is above a predetermined carbon monoxide threshold level.

13. The carbon monoxide activated garage door opening system of claim 12, wherein, upon validating said unsafe carbon monoxide level, said second carbon monoxide detector generates and transmits third and fourth true signals to said logic gate and said switch respectively and thereby maintains said switch at a closed position;
   wherein, upon receiving said first and third true signals, said logic gate generates and transmits an true output override signal to said user interface thereby instructing said user interface to adapt the garage door to an open position.

14. The carbon monoxide activated garage door opening system of claim 13, wherein, upon invalidating said unsafe carbon monoxide level, said second carbon monoxide detector generates and transmits first and second false signals to said logic gate respectively and thereby toggles said switch to an open position;
   wherein, upon receiving said third false signal, said logic gate generates and transmits a false output override signal to said user interface thereby instructing said user interface to take no action.

15. A method of utilizing a carbon monoxide activated garage door opening system for preventing exposure to lethal levels of carbon monoxide inside a garage, said method comprising the steps of:
   providing and connecting a garage door opening system to an existing garage door;
   providing and communicatively coupling a portable and manually operable user interface to said garage door opening system for toggling said garage door between open and closed positions based upon receiving a corresponding user input at said user interface;
   providing and locating a first carbon monoxide detector in said user interface for detecting an initial carbon monoxide level in the ambient air surrounding said user interface;
   providing and attaching a second carbon monoxide detector to a rear side of said user interface for confirming whether said initial carbon monoxide level is an unsafe carbon monoxide level; and
   upon validating said unsafe carbon monoxide level, said user interface automatically overriding said user input and thereby opening the garage door.

\* \* \* \* \*